Patented Oct. 27, 1953

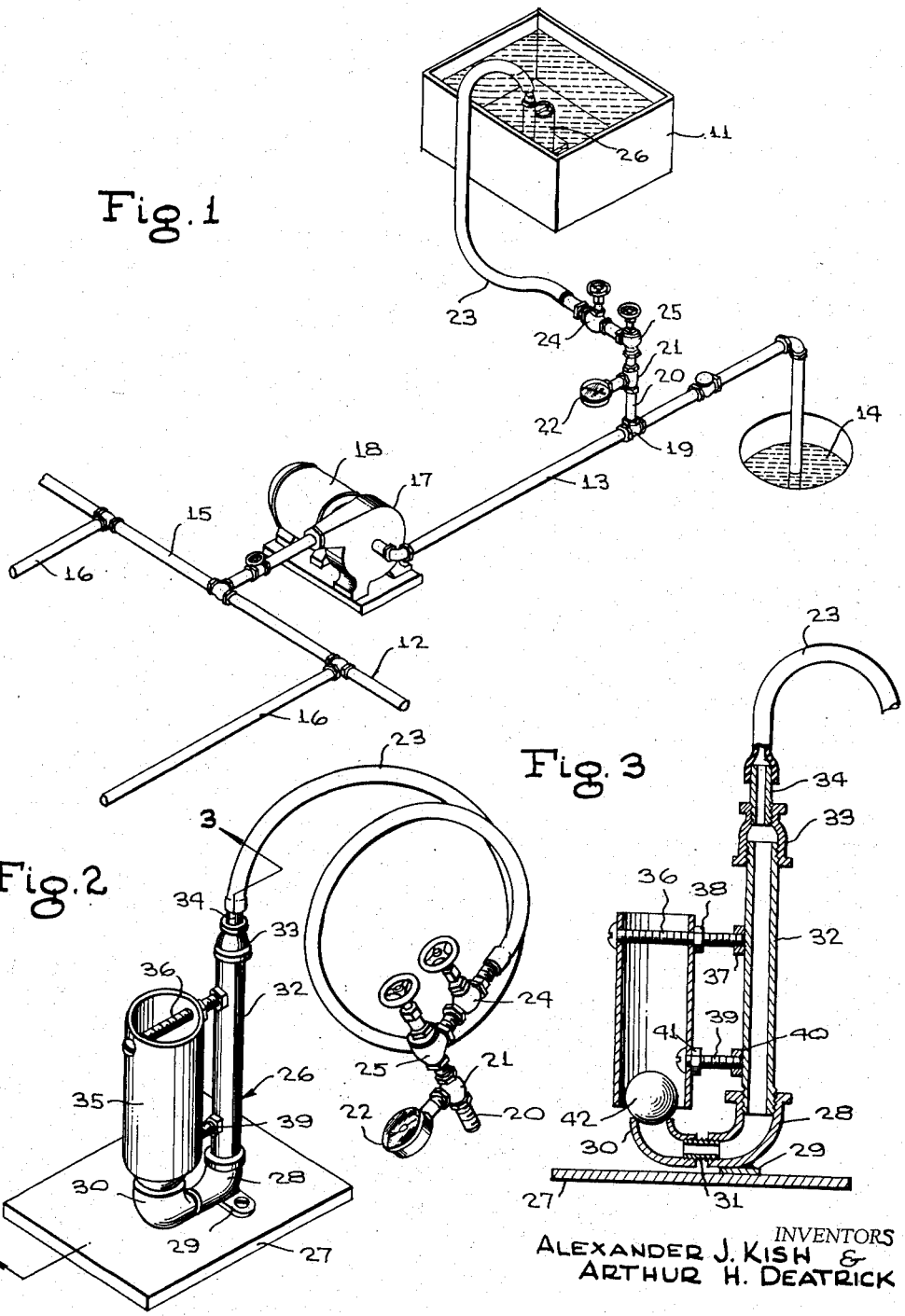

2,656,849

UNITED STATES PATENT OFFICE 2,656,849

METERING APPLIANCE WITH AUTOMATIC SOLUTION SHUTOFF DEVICE

Arthur H. Deatrick and Alexander J. Kish, Miami, Fla.

Application November 30, 1951, Serial No. 259,238

2 Claims. (Cl. 137—399)

This invention relates to liquid distribution systems, and more particularly to an improved automatic cutoff device for use in apparatus designed to inject plant food, insecticide, and similar liquid material into a water distribution system.

A main object of the invention is to provide a novel and improved device for injecting plant food, insecticide, and similar liquid material into the water line of an irrigation system or the like, the improved device being simple in construction, being easy to install and being reliable in operation.

A further object of the invention is to provide an automatic cutoff valve for use in the supply tank of a plant food or insecticide injection system, the improved cutoff device involving inexpensive parts, being rugged in construction, and automatically closing the supply line to the water distribution system when the liquid material in the supply tank becomes substantially exhausted.

Further objects and advantages of the invention will become apparent from the following description and claims, and from the accompanying drawings, wherein:

Figure 1 is a perspective view showing a liquid distribution system provided with an improved automatic cutoff device in the supply tank thereof, in accordance with the present invention.

Figure 2 is an enlarged perspective view of the automatic cutoff device employed in Figure 1 and showing the connection of the cutoff device to the flexible conduit leading to the water line of the system.

Figure 3 is a vertical cross sectional view taken on the line 3—3 of Figure 2.

Referring to the drawings, 11 designates a supply tank which may be used to contain insecticide, plant food, or similar material to be injected into a water irrigation or similar system, the water irrigation system being designated generally at 12 and comprising a water line 13 leading from a well 14 to a main conduit 15. Connected to the main conduit 15 are the respective branch conduits 16. Connected in the water line 13 is the suction pump 17 which is driven by an electric motor 18, as shown. The water line 13 includes a T fitting 19 to which is connected a nipple 20. Connected to the nipple 20 is another T fitting 21 having a vacuum gauge 22 connected to one arm thereof. Designated at 23 is a flexible conduit which is connected to the T fitting 21 through the metering needle valve 24 and the ground seat angle valve 25 arranged as shown in Figure 1. The flexible conduit 23 is connected to the automatic cutoff device, positioned in the supply tank 11, and designated generally at 26.

The automatic cutoff device 26 comprises a flat base plate 27 on which is rigidly secured the elbow 28, as by integral apertured lugs 29 secured to the bottom of the elbow 28, as viewed in Figures 2 and 3. Designated at 30 is a second elbow connected to the elbow 28 by a short nipple 31, the assembly of the elbows 28 and 30, together with the nipple 31, defining a U-shaped conduit. Threadedly secured in the upwardly facing end of the elbow 28 is the vertical conduit 32 whose top end is connected to the flexible conduit 23 through a reducer fitting 33, and a nipple 34 secured in the smaller end of the reducer fitting 33 and frictionally secured in the end of the flexible conduit 23, as shown in Figure 3.

Designated at 35 is a vertical sleeve which is secured over the open end of the elbow 30, as by a diametrically extending bolt 36 extending through the sleeve 35 at its top portion and threadedly engaged in an internally threaded boss 37 provided on the vertical sleeve 32. A lock nut 38 is provided on the bolt 36 to clamp the sleeve 35 rigidly to the bolt. A second bolt 39 extends through the wall of sleeve 35 at its lower portion and is threadedly engaged in an internally threaded boss 40 provided on the lower portion of the conduit 32, the sleeve 35 being clamped to the bolt 39 by a lock nut 41 provided on said bolt, as shown. As shown in Figure 3, the sleeve 35 is rigidly secured to the conduit 32 in vertical position, parallel to said conduit, and substantially in vertical alignment with the center of the opening end of elbow 30, and is substantially centered thereover. Designated at 42 is a float ball which is freely positioned in the sleeve 35 and is adapted to seat on the open end of the elbow 30, as shown in Figure 3. The float ball 42 is somewhat larger than the rim of the elbow 30, and the sleeve 35 is somewhat larger in diameter than the ball 42, and the bottom rim of the sleeve 35 is positioned slightly above the rim of the open end of elbow 30.

It will be noted that upward movement of the float ball 42 is limited by the diametrically extending bolt 36, whereby the float ball is contrained to remain within the sleeve 35 at all times.

In using the device, the tank 11 is filled with the solution which is to be injected into the water line 13 and the cutoff device 26, connected to the conduit 23, is positioned in the tank 11. The valves 24 and 25 are opened in accordance with the desired rate of flow of the insecticide, plant food or other material in the supply tank 11 which must be provided to obtain the desired concentration thereof in the water being distributed, the material from tank 11 being drawn by suction into the line 13 by the action of the suction pump 17. The material mixes with the water from well 14 and provides a desired concentration at the distribution end of the system. The float ball 42 remains in an elevated position relative to the rim of the open top end of elbow 30 until the supply of liquid in tank 11 is substantially exhausted. When said supply diminishes to a level whereby the ball 42 seats on the open top end of elbow 30, the device 26 cuts off any further supply and seals the conduit 23 so that air cannot enter the water distribution system.

While a specific embodiment of an improved automatic shutoff device for use in the supply tank of an injection system for distributing plant food, insecticide, and similar material in a water line has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a liquid distribution system of the type comprising a container, a suction line and a supply conduit connected to said suction line, an automatic suction cutoff device in said container comprising a base, a U-shaped conduit rigidly secured to said base, a vertical conduit rigidly connected to one arm of said U-shaped conduit, means connecting said vertical conduit to the supply conduit, a vertical sleeve, means rigidly securing said sleeve to said vertical conduit over and in vertically spaced relation to the rim of the other arm of said U-shaped conduit, a float ball freely positioned in said sleeve for vertical movement in the sleeve and in the space between the lower end of the sleeve and said rim and adapted to seat on the rim of said other arm, and a diametrically extending stop rod secured in the top end of the vertical sleeve to limit upward movement of said float ball.

2. In a liquid distribution system of the type comprising a container, a suction line and a supply conduit connected to said suction line, an automatic suction cutoff device in said container comprising a base, a U-shaped conduit rigidly secured to said base, a vertical conduit rigidly connected to one arm of said U-shaped conduit, means connecting said vertical conduit to the supply conduit, a vertical sleeve, means rigidly securing said vertical sleeve to said vertical conduit over and in vertically spaced relation to the rim of the other arm of said U-shaped conduit, said means including a bolt extending diametrically through the top portion of said sleeve and threadedly engaging said vertical conduit, a float ball freely positioned in said sleeve for vertical movement in the sleeve and in the space between the lower end of the sleeve and said rim and adapted to seat on the rim of said other arm, said bolt defining stop means limiting upward movement of said float ball in the sleeve.

ARTHUR H. DEATRICK.
ALEXANDER J. KISH.

References Cited in the file of this patent

UNITED STATES PATENTS

| Number | Name | Date |
|---|---|---|
| 2,141,638 | Bean | Dec. 27, 1938 |

FOREIGN PATENTS

| Number | Country | Date |
|---|---|---|
| 9,346 | Great Britain | 1907 |